(12) United States Patent
Zhou et al.

(10) Patent No.: US 11,119,504 B2
(45) Date of Patent: Sep. 14, 2021

(54) MACHINE LEARNING BASED AIRFLOW SENSING FOR AIRCRAFT

(71) Applicant: International Business Machines Corporation, Armonk, NY (US)

(72) Inventors: Wang Zhou, White Plains, NY (US); Huan Hu, Yorktown Heights, NY (US); Wei Tan, Elmsford, NY (US); Qianwen Chen, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

(21) Appl. No.: 16/184,554

(22) Filed: Nov. 8, 2018

(65) Prior Publication Data

US 2020/0151553 A1     May 14, 2020

(51) Int. Cl.
*G05D 1/08* (2006.01)
*G06N 3/08* (2006.01)
(Continued)

(52) U.S. Cl.
CPC .......... *G05D 1/0816* (2013.01); *B64C 11/305* (2013.01); *B64D 43/02* (2013.01); *G05D 1/00* (2013.01); *G05D 1/0204* (2013.01); *G05D 1/046* (2013.01); *G05D 1/063* (2013.01); *G05D 1/0623* (2013.01); *G05D 1/0638* (2013.01); *G06K 9/6256* (2013.01); *G06N 3/08* (2013.01); *G06N 3/0454* (2013.01)

(58) Field of Classification Search
CPC .... G05D 1/0816; G05D 1/046; G05D 1/0623; G05D 1/0204; G05D 1/063; G05D 1/0638; G05D 1/00; B64C 11/305; G06N 3/08; G06N 3/0454; B64D 43/02; G06K 9/6256
See application file for complete search history.

(56) References Cited

U.S. PATENT DOCUMENTS 5,639,964 A * 6/1997 Djorup ..................... G01P 5/00
73/170.12
6,466,888 B1   10/2002 McCool et al.
(Continued)

FOREIGN PATENT DOCUMENTS

CA      3000145 A1   6/2018
WO   2004101358 A2   11/2004

OTHER PUBLICATIONS

L. Chenglong, "A vortex-ring-state-avoiding descending control strategy for multi-rotor UAVs," 2015 34th Chinese Control Conference (CCC), Hangzhou, 2015, pp. 4465-4471.
(Continued)

*Primary Examiner* — Dale W Hilgendorf
(74) *Attorney, Agent, or Firm* — Garg Law Firm, PLLC; Rakesh Garg; Anthony Curro

(57) ABSTRACT

Using a set of airflow sensors disposed on an airfoil of an aircraft, first airflow data including an amount of airflow experienced at each airflow sensor at a first time is measured. Using a trained neural network model, the first airflow data is analyzed to determine an airflow state of the aircraft. In response to determining that the aircraft is in the abnormal airflow state, a control surface and a power unit of the aircraft are adjusted. Responsive to the adjusting, the aircraft is returned to the normal airflow state.

20 Claims, 9 Drawing Sheets

(51) Int. Cl.
  *B64D 43/02* (2006.01)
  *G06K 9/62* (2006.01)
  *G05D 1/00* (2006.01)
  *G05D 1/04* (2006.01)
  *G05D 1/06* (2006.01)
  *G05D 1/02* (2020.01)
  *B64C 11/30* (2006.01)
  *G06N 3/04* (2006.01)

(56) References Cited

U.S. PATENT DOCUMENTS

| | | | | |
|---|---|---|---|---|
| 6,735,500 | B2* | 5/2004 | Nicholas et al. | B64C 27/56 |
| | | | | 701/3 |
| 8,682,824 | B2* | 3/2014 | Shibuya et al. | G05B 23/021 |
| | | | | 706/45 |
| 9,037,316 | B2* | 5/2015 | Abildgaard | G06F 17/00 |
| | | | | 701/7 |
| 9,580,186 | B1* | 2/2017 | Greene | B64C 27/006 |
| 9,758,257 | B1* | 9/2017 | Frolov | B64D 43/02 |
| 10,191,076 | B1* | 1/2019 | Wang | G01P 5/07 |
| 10,450,083 | B2* | 10/2019 | Frolov | G05D 1/104 |
| 2009/0089006 | A1* | 4/2009 | Certain | B64C 27/006 |
| | | | | 702/144 |
| 2012/0086209 | A1* | 4/2012 | Obrecht | F03D 17/00 |
| | | | | 290/55 |
| 2017/0369181 | A1* | 12/2017 | Certain | B64D 45/00 |
| 2018/0281984 | A1* | 10/2018 | Frolov | B64D 43/00 |
| 2021/0109547 | A1* | 4/2021 | Clark | G05D 1/0816 |

OTHER PUBLICATIONS

W. Johnson, "Model for Vortex Ring State Influence on Rotorcraft Flight Dynamics." Presented at the AHS 4th Decennial Specialist's Conference on Aeromechanics, San Francisco, California, Jan. 21-23, 2004. pp. 1-61. (American Helicopter Society International, Inc.)

O. Westbrook-Netherton (2014) "An investigation into predicting vortex ring state in rotary aircraft." In: RAeS Advanced Aero Concepts, Design and Operations, University of Bristol, Bristol, UK, Jul. 22-24, 2014. London: Royal Aeronautical Society. https://www.researchgate.net/ublication/280234195_An_Investigation_into_Predicting_Vortex_Ring_State_in_Rotary_Aircraft.

* cited by examiner

MACHINE LEARNING BASED AIRFLOW SENSING FOR AIRCRAFT

TECHNICAL FIELD

The present invention relates generally to a method, system, and computer program product for airflow sensing. More particularly, the present invention relates to a method, system, and computer program product for airflow sensing for aircraft, using machine learning.

BACKGROUND

An aircraft means a device that is used or intended to be used for flight in the air. An airplane is an engine-driven fixed-wing aircraft heavier than air, that is supported in flight by the dynamic reaction of the air against its wings. A rotorcraft, or rotary-wing aircraft, is a heavier-than-air aircraft that depends principally for its support in flight on the lift generated by one or more rotors.

An unmanned aircraft system (UAS), also called a drone or unmanned aircraft vehicle (UAV), is an aircraft without a human pilot onboard. Instead, the UAS is controlled from an operator on the ground. Similar to larger, human-piloted aircraft, drones may be fixed-wing or rotary wing.

Fixed-wing drones, as the name implies, have a rigid wing fixed into place. Although control surfaces—small appendages attached to the wing—may move to control the drone's movements, the main part of the wing does not. Similar to passenger-carrying airplanes, fixed-wing drones are typically propelled forward by a propeller turned by an internal combustion engine or electric motor. This forward thrust causes air to flow over the wing, or airfoil, generating lift and causing the drone to fly. As used herein, an airfoil is the cross-sectional shape of a wing or propeller or rotor. Fixed-wing drones cannot take off or land vertically, so require a runway. However, fixed-wing drones can stay airborne longer than rotary wing drones because they can glide. Fixed-wing drones also hold more payload weight and have better overall power efficiency than rotary-wing drones of similar sizes.

Rotary wing UAVs have at least one rotor—two or more rotor blades that revolve around a fixed mast. Rotary wing UAVs may have one rotor (helicopter), three rotors (tricopter), four rotors (quadcopter), six rotor (hexacopter), eight rotors (octocopter), and other rotor arrangements. For example, a Y6 configuration is a tricopter with twin rotors on each arm, one pointing upwards and one pointing downwards.

Rotor blades also generate lift using airflow over the blades, but constant aircraft forward movement is not needed to produce the airflow. Instead the blades themselves are in constant movement, turned by a power unit to produce the required airflow over their airfoil to generate lift. As a result, rotary-wing drones can take off and land vertically, without requiring a runway.

Because airflow over wings or rotor blades is needed to generate lift, it is important when flying both types of drones that airflow not be disrupted. In aerodynamics, angle of attack (AOA) is the angle between the oncoming air and a reference line.

In fixed-wing aircraft, the reference line is generally on the airplane or wing, such as a line connecting one wingtip to the other wingtip. Thus, if the wing of a fixed-wing drone is flying straight and level, the wing is nearly parallel to the oncoming air and the angle of attack is almost zero. (Fixed-wing aircraft are typically designed to have a small, non-zero angle of attack in level flight, to aid stability and controllability.) To increase a fixed-wing aircraft's altitude, one raises the nose of the aircraft relative to its tail. This increases the angle of attack, which generates more lift, propelling the aircraft upwards.

However, increased angle of attack cannot produce increased lift indefinitely. Instead, once the angle of attack is increased past the critical angle of attack (the angle of attack which produces maximum lift), air begins to flow less smoothly over the upper surface of the airfoil and begins to separate from the upper surface, generating less lift. At this point, the wing is said to be stalled, or in a stall.

If the wing continues in the stalled state, the aircraft loses altitude rapidly, because the disrupted airflow is not generating enough lift to keep the aircraft aloft. As well, aircraft control surfaces, used for steering the aircraft, also rely on consistent airflow to work correctly. If airflow over the control surfaces is also disrupted the control surfaces will lose effectiveness, rendering the aircraft much less controllable. Thus, pilots of both manned and unmanned fixed-wing aircraft are taught to avoid stalls, and are taught methods for recovering from stalls should they occur.

Because the blades of rotary-wing aircraft are also airfoils, they are also subject to stalls when angle of attack is increased beyond the critical angle of attack. This can happen when rotor revolutions per minute (RPM) drop too low. When power is no longer available to maintain RPM, and therefore lift, the drone begins to descend. This changes the relative wind over the blades, further increasing the angle of attack. If the angle of attack increases beyond the critical angle of attack, the blades will stall. At that point, it is almost impossible to get smooth air flowing across the blades again to generate lift, and the drone will drop rapidly, out of control.

Rotary wing drones are also subject to another airflow disruption, called vortex ring state (VRS) or settling with power. When hovering, a rotary wing drone remains stationary by propelling a large mass of air down through the main rotor. Some of the air is recirculated near the tips of the blades, curling up from the bottom of the rotor system and rejoining the air entering the rotor from the top. This phenomenon is common to all airfoils and is known as tip vortices. As long as the tip vortices are small, their only effect is a small loss in rotor efficiency. However, if the drone begins to descend vertically, it settles into its own downwash, greatly enlarging the tip vortices. In this vortex ring state, most of the power developed by the engine is wasted in accelerating the air in a doughnut pattern around the rotor. As well, if the drone descends too fast, a secondary vortex ring can develop, creating an unsteady turbulent airflow over a large area of the disc formed by the rotating blades. In a fully developed VRS, the drone will be unstable, with little control authority, and descending rapidly.

Because blade stalls, VRS, and other disruptions of airflow over the blades can render rotary wing aircraft much less controllable and in a rapid descent—a situation that can be unrecoverable. Thus, pilots of both manned and unmanned rotary-wing aircraft are taught to avoid these situations, and are taught recovery methods should they occur.

SUMMARY

The illustrative embodiments provide a method, system, and computer program product. An embodiment includes a method that measures, using a set of airflow sensors disposed on an airfoil of an aircraft, first airflow data comprising an amount of airflow experienced at each airflow sensor at a first time. An embodiment analyzes, using a trained neural network model, the first airflow data to determine an airflow state of the aircraft. An embodiment adjusts, in response to determining that the aircraft is in the abnormal airflow state, at least one member from a set comprising (i) a control surface and (ii) a power unit of the aircraft. An embodiment returns, responsive to the adjusting, the aircraft to the normal airflow state.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
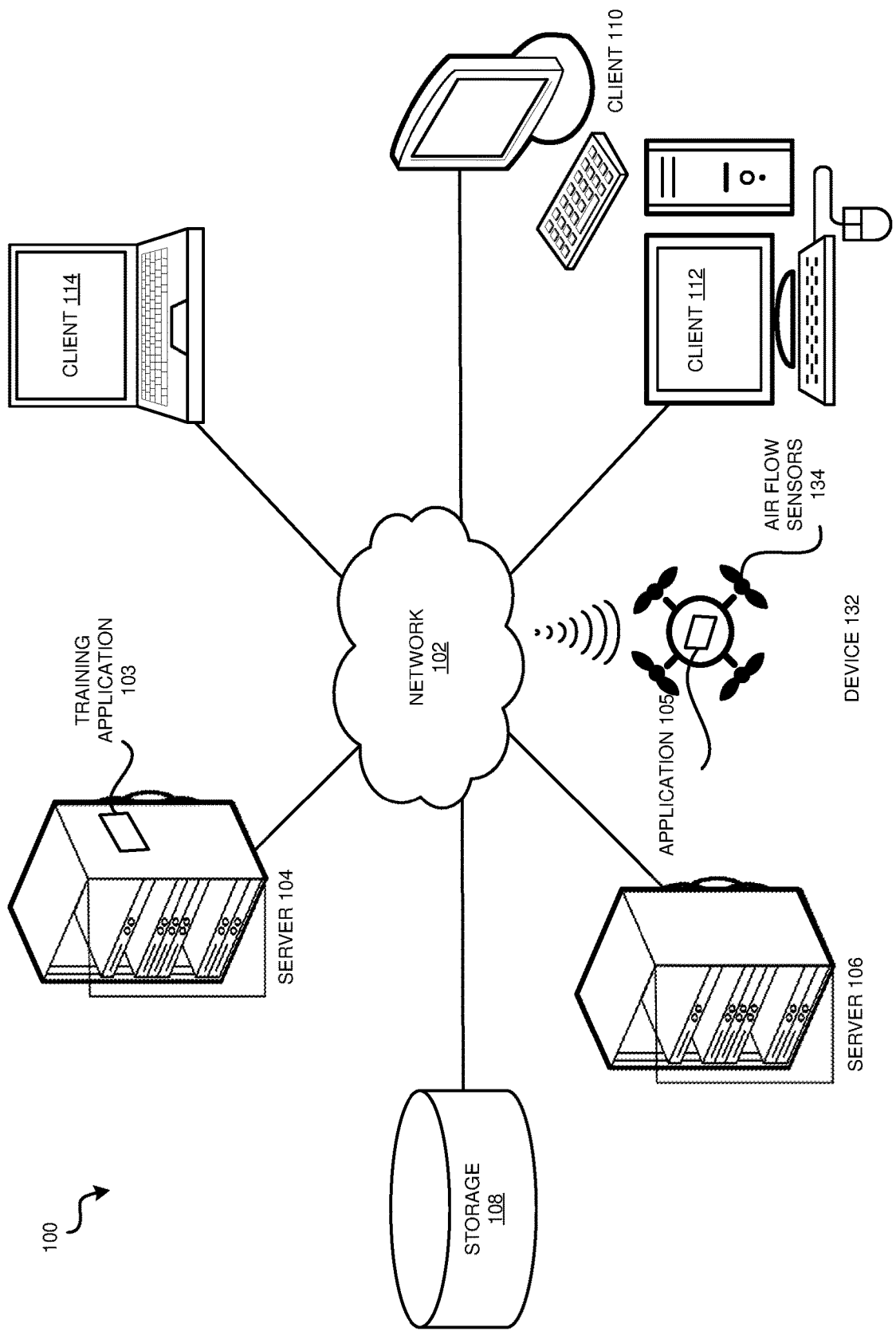
FIG. 1 depicts a block diagram of a network of data processing systems in which illustrative embodiments may be implemented.

Manned fixed-wing aircraft are typically designed to warn pilots of an impending stall. For example, wings may be designed with aerodynamic characteristics that create a mushy feeling or a vibration in the controls or the airframe, or a mechanical tab or a hole affixed to the leading edge of the wing can activate in response to disturbed airflow. Angle of attack sensors that measure angle of attack directly—for example, using a lift transducer installed on the leading edge of the wing—are also becoming available. As well, airspeed is a useful proxy for measuring angle of attack directly, and pilots are taught to keep airspeed within certain parameters. However, the airspeed at which a wing stalls varies with the mass of the aircraft, how steeply it is turning, and other factors, and a wing can actually stall at any speed, any attitude, and any engine power setting—so airspeed is not a perfect proxy.

However, the illustrative embodiments recognize that such techniques are unsuited to small (with a wingspan of under about two meters), typically unmanned fixed-wing aircraft. Altered control feel is typically transmitted to a pilot through mechanical couplings; wirelessly transmitting such variations to a ground-based pilot adds expense and complication. As well, airframe vibrations and other sensations manned aircraft pilots experience while flying are also difficult to transmit effectively to a ground-based pilot. Mechanical stall warning systems and angle of attack sensors are typically mounted on the leading edge of a wing, but can be large and heavy compared to the small wing sizes of unmanned craft. For example, one commercially available stall warning system intended for four-passenger airplanes is about four centimeters across; while the wing-mount portion of one commercially available angle of attack sensor for similar applications is about seven centimeters across. If mounted on a typical fixed-wing drone, these sensors could take up ten percent of the total wingspan, negatively affecting flying qualities and aerodynamic efficiency. Further, such detection systems only sense airflow in their immediate area, potentially missing an airflow disruption in another area of the wing.

Manned rotary-wing aircraft are also typically designed to warn pilots of impending airflow problems. Pilots are taught to keep rotor speeds and forward airspeed within specified parameters. Controls, or the entire aircraft, may feel differently in disturbed airflow as well. Pilots are taught to recognize the signs of impending problems in time to prevent them or attempt a recovery.

However, the illustrative embodiments recognize that such techniques are unsuited to small (with a rotor blade length under about 0.75 meters, particularly remotely-piloted, rotary wing aircraft. While altered control feel can be transmitted wirelessly for a pilot on the ground to feel, altered aircraft feel is more difficult to convey effectively to a ground-based pilot. Fuselage-mounted airspeed indicators measure forward speed of the entire aircraft, not airflow around rotating blades. Blade-mounted angle of attack sensors are not feasible, especially for small rotary wing drone blades. Further, as with fixed-wing aircraft, such detection systems only sense airflow in their immediate area, potentially missing an airflow disruption in another area of a blade or on another blade.

The illustrative embodiments also recognize that out of control aircraft also impact the ground in an uncontrolled manner, damaging or destroying the aircraft and potentially damaging people or property on the ground. Manned aircraft that crash can also hurt pilots and passengers.

The illustrative embodiments recognize that it can be difficult for pilots to configure aircraft—both fixed-wing and rotary wing—for the most energy-efficient operation. There may be more than one combination of forward speed, engine power settings, and corresponding angle of attack that yields comparable performance at different rates of fuel burn. As well, air density decreases as aircraft climb, resulting in sparser airflow over wings and blades to generate lift, as well as sapping the performance of some types of engines. Further, UAVs are typically battery powered, and adding additional batteries adds weight that must be lifted. Thus, users want to make the most efficient use of available power.

The illustrative embodiments recognize that the presently available tools or solutions do not address these needs or provide adequate solutions for these needs. The illustrative embodiments used to describe the invention generally address and solve the above-described problems and other problems related to machine learning based airflow sensing for aircraft.

An embodiment can be implemented as a combination of hardware and a software application. The application implementing an embodiment can be configured as a modification of an existing aircraft control system, as a separate application that operates in conjunction with an existing aircraft control system, a standalone application, or some combination thereof.

Particularly, some illustrative embodiments provide a method by which output from an array of small sensors, mounted on an airfoil, can be analyzed using machine learning techniques to recognize airflow patterns. The airflow patterns can then be used to predict impending airflow problems, such as stalls and VRS, and to optimize airflow for energy efficient flight.

An embodiment includes an array of micro-machined airflow sensors. As used herein, micro-machining refers to any technique for fabricating two- or three-dimensional structures on the micrometer scale. Inspired by hair cells found in nature that detect airflow, each sensor includes a flexible element that is displaced by airflow, along with another element to detect the degree of displacement. One exemplary sensor implementation includes a polymer (for example, SU-8 photoresist material or polydimethylsiloxane (PDMS)) post affixed to a silicon micro-cantilever doped with phosphorus or boron to induce the piezoresistive property of silicon. Other sensor implementations are also possible and contemplated within the scope of the illustrative embodiments. A micro-cantilever is a structure with a cantilever arm of length in the range of 1 micron to 10 millimeters. The post also has a length in the range of 1 micron to 10 millimeters. Airflow exerts a force on the flexible post, deforming the attached micro-cantilever. The deformation creates a corresponding electrical resistance change. Such a resistance change is measurable, for example by using a Wheatstone bridge to convert the resistance change to a corresponding voltage change which is amplified and detected. Such micro-machined hair sensors are less than a tenth the size of conventional airflow sensors, easy to mount on drone airfoils, low-cost, and sensitive to small airflow changes. As well, an array of sensors provides airflow information at many locations on an airfoil, not just one, allowing creation of an airflow map for the entire surface of an airfoil.

For use in flight, an embodiment includes an array of micro-machined airflow sensors mounted on an airfoil. For a fixed-wing drone, sensors are mounted at various locations along the wing, including the leading edge, areas around the control surfaces, and the upper surface of the wing. For a rotary drone, sensors are mounted at various locations on the drone body frame, along one or more rotor blades, or both.

During flight, an embodiment periodically collects a degree of deflection, converted to a voltage level, from each of the airflow sensors, and saves each voltage level in a location in a two dimensional data array. Thus, each data array represents airflow over the array of sensors at a particular time and can be analyzed as an image. As well, because each image, taken in series, represents airflow changes over time, a sequence of images can be analyzed as video content.

An embodiment includes a neural network trained to recognize an airflow state. Once trained, when the embodiment recognizes the trained airflow state, the embodiment takes an action. Possible actions include warning an operator, and adjusting the flight controls of an embodiment to change the airflow state.

One embodiment is trained to recognize VRS in a rotary drone. To begin, an embodiment collects training data. To collect sufficient training data encompassing likely signs of an impending or actual VRS state, humans fly an embodiment through a series of maneuvers, coming closer to VRS each time before recovering the embodiment into normal flight. Eventually the embodiment is flown completely into VRS, at a sufficient height to allow recovery before impacting the ground. During each series of maneuvers, the embodiment collects a sequence of images. Each pixel in an image represents data from an airflow sensor at a particular time, and the resulting image represents airflow around the embodiment at a particular time. An embodiment collects images at periodic intervals—for example, once per second, twice per second, or any other suitable interval sufficient to obtain enough detail of the airflow changes around the embodiment when approaching a VRS state.

Each data sample from each airflow sensor is labeled with a corresponding binary status. If the status is 0, airflow detected by a sensor is not in a VRS state; if the status is 1, airflow is in a VRS state. Human observers can perform the labeling, the labeling can be assigned based on sensor deflection above or below a threshold, or a combination of both techniques can be used. Because there are likely to be many more samples with a normal, or 0, status than there are samples with an abnormal status, an embodiment uses only a subset of the normal samples to ensure a sufficient—for example, one percent of the total—number of abnormal samples is also present. An embodiment uses the resulting collection of classified data arrays as training data.

Because the training data is similar to image data, an embodiment uses known techniques for training neural networks to recognize features in images to similarly train a neural network to recognize a VRS state. For example, one embodiment uses a deep neural network, using both convolution layers and fully connected layers, to fit a mapping, or in other words learn a correspondence between airflow data samples and corresponding status bits. One example of a suitable neural network is the VGG neural network, a convolutional neural network designed by Visual Geometry Group at Oxford University and including 16-19 weight layers and small convolutional filters of size 3×3 and 1×1. However, other suitable neural networks are also usable and contemplated within the scope of the illustrative embodiments.

Once the neural network has been trained to determine whether a particular snapshot of airflow sensor data represents a VRS state, an embodiment uses the neural network to do just that. In flight, an embodiment periodically collects a snapshot of airflow sensor data. The embodiment uses the now-trained neural network to analyze the snapshot, determining if the embodiment is presently in VRS or in a state close to VRS, or in normal flight. If the embodiment is in or approaching VRS, the embodiment takes appropriate recovery actions to return to normal flight.

Another embodiment is trained to recognize a stall state in a fixed-wing drone. To collect sufficient training data encompassing likely signs of an impending stall state, humans fly an embodiment through a series of maneuvers, entering a stall state each time from a variety of different starting states before recovering the embodiment into normal flight. For example, different starting states can be straight ahead, left and right turns of varying radii, and the like. During each series of maneuvers, the embodiment collects a sequence of images, where each pixel in an image represents data from an airflow sensor at a particular time, and the resulting image represents airflow around the embodiment at a particular time. An embodiment collects images at periodic intervals—for example, once per second, twice per second, or any other suitable interval sufficient to obtain enough detail of the airflow changes around the embodiment when approaching a stall state.

Each data sample from each airflow sensor is labeled with a corresponding binary status. If the status is 0, airflow detected by a sensor is flowing smoothly; if the status is 1, airflow is disturbed. An embodiment subsamples the normal samples to ensure a sufficient number of abnormal samples. An embodiment uses the resulting collection of classified data arrays as training data.

An embodiment trains a neural network to recognize a stalled state. For example, one embodiment uses a deep neural network, using both convolution layers and fully connected layers, to fit a mapping, or in other words learn a correspondence, between airflow data samples and corresponding status bits. One example of a suitable neural network is the VGG neural network, but other suitable neural networks are also publicly available.

Once the neural network has been trained to determine whether a particular snapshot of airflow sensor data represents a stall state, an embodiment uses the neural network to do just that. In flight, an embodiment periodically collects a snapshot of airflow sensor data. The embodiment uses the now-trained neural network to analyze the snapshot, determining if the embodiment is presently in a stall or in a state close to a stall, or in normal flight. If the embodiment is in or approaching a stall, the embodiment takes appropriate recovery actions to return to normal flight.

Similarly, another embodiment uses an array of airflow sensors and a trained neural network to detect other aerodynamic conditions affecting an airfoil. Such an embodiment is not limited to unmanned aircraft, but is usable on manned aircraft as well. For example, when aircraft are flown in temperatures below the freezing point of water, moisture in the air can freeze onto an airfoil, altering the airfoil's shape and consequently, the airfoil's flying qualities. An embodiment can be trained and used to detect icing-related airflow changes and warn a pilot, allowing an opportunity for remedial action before ice accumulates to a point that the aircraft can no longer fly.

Another embodiment uses an array of airflow sensors and a trained neural network to predict and optimize energy usage. To begin, an embodiment collects training data in flight. The training data includes a time series of airflow sensor data snapshots and corresponding snapshots of data representing the states of relevant control inputs. The training data also includes energy consumption data over the same time series. Next, an embodiment trains a recurrent neural network to fit the mapping, or in other words find a correspondence, between airflow sensor data and corresponding control settings to the resulting energy consumption. Once the neural network is trained, an embodiment uses the neural network to predict energy consumption in real time, based on the current airflow and control input states.

For example, suppose an aircraft uses more energy in a climbing steep turn than it does in straight and level flight. An airflow data sequence and corresponding control input states corresponding to a climbing steep turn will also be different from an airflow data sequence and corresponding control input states corresponding to straight and level flight. Thus, the neural network of an embodiment learns to recognize state 1 (straight and level) with a particular energy consumption and state 2 (climbing steep turn) with another particular energy consumption. Then an embodiment uses the now-trained neural network to recognize a particular combination of airflow and control inputs and obtain a corresponding expected energy consumption.

Once an embodiment is trained to predict energy consumption in real time, based on the current airflow and control input states, the embodiment also determines control inputs corresponding to optimal energy usage. There may be more than one combination of forward speed, engine power settings, and corresponding attitude that yields comparable performance at different rates of fuel burn. For example, a fixed-wing aircraft can fly straight and level, at a particular airspeed with its nose very slightly above its tail, using a particular amount of energy to stay level. The same aircraft can also fly straight and level at the same airspeed with its nose at a higher degree of elevation relative to its tail, using more energy to stay level. However, the first state is more energy-efficient than the second, and thus is preferred. Thus, an embodiment includes a model that sets the aircraft controls and motor to settings corresponding to the most energy-efficient settings. In particular, the model inputs are (state, action, reward) tuples in which states are airflow sensor data, actions are control input states, and rewards are power usage rates. The model outputs are state to action mappings indicating which action to take in which state. Reinforcement learning algorithms such as policy gradient methods can be used to train the model, learning a state to action mapping function that optimizes rewards (here, power usage rates), resulting in the most energy-efficient settings.

The manner of machine learning based airflow sensing for aircraft described herein is unavailable in the presently available methods. A method of an embodiment described herein, when implemented to execute on a device or data processing system, comprises substantial advancement of the functionality of that device or data processing system in analyzing, using neural networks and machine learning techniques, the output of an array of airflow sensors to recognize aerodynamic states and make further use of the aerodynamic state information.

The illustrative embodiments are described with respect to certain types of aircraft, fixed-wing aircraft, rotary aircraft, airflow sensors, control inputs, neural networks, machine learning techniques, aerodynamic states, events, forecasts, thresholds, trainings, validations, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
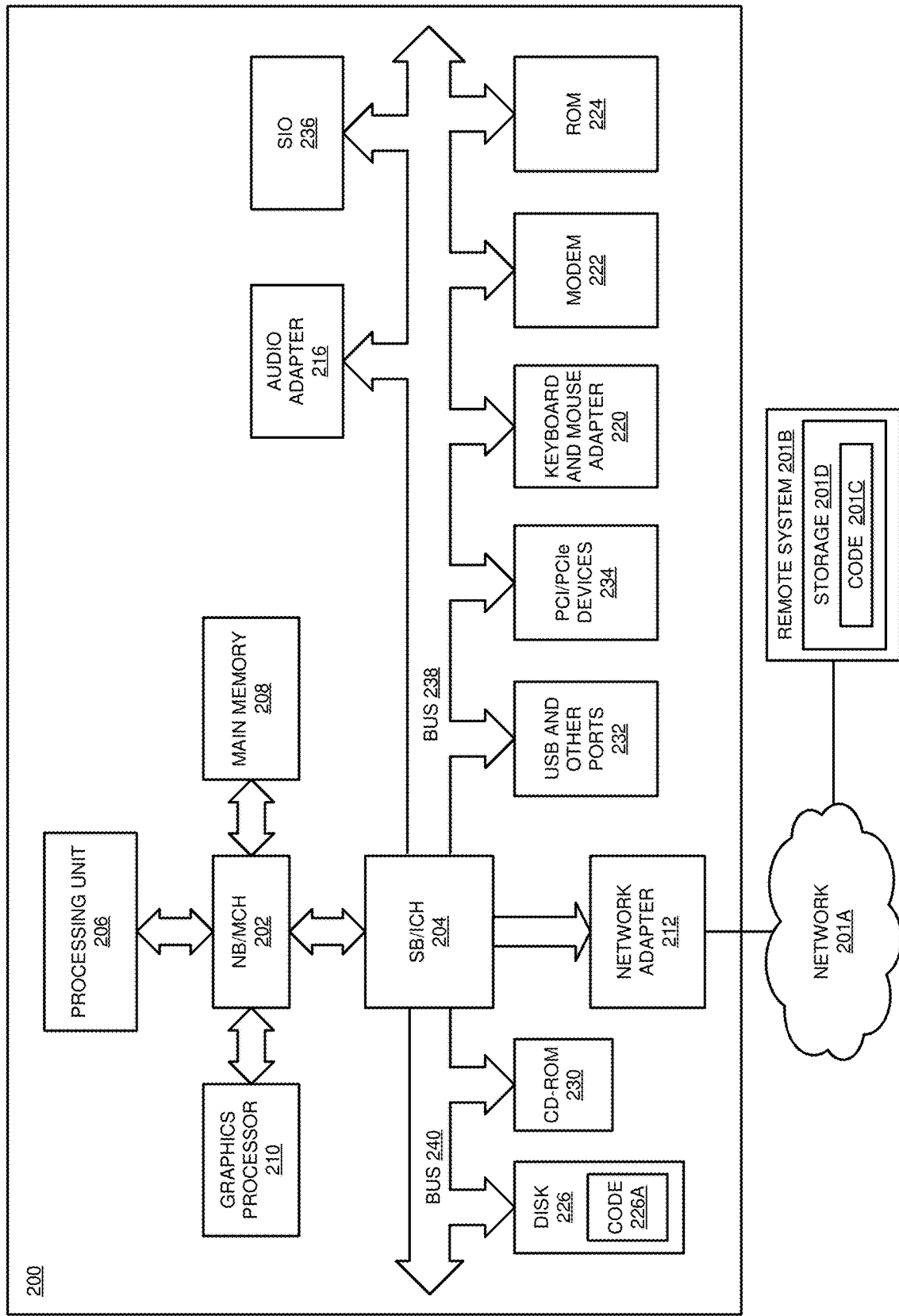
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a fixed-wing or rotary drone, a fixed-wing or rotary manned aircraft, or any other suitable device. Device 132 includes a set of airflow sensors 134 disposed on an airfoil or rotor blade of device 132. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in device 132. Alternatively, training application 103, a portion of application 105 devoted to training neural networks, executes in any suitable device, such as any of servers 104 and 106 and clients 110, 112, and 114.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114 and device 132. Clients 110, 112, and 114 and device 132 may be clients to server 104 in this example. Clients 110, 112, 114, and device 132 or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as training application 103 and application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
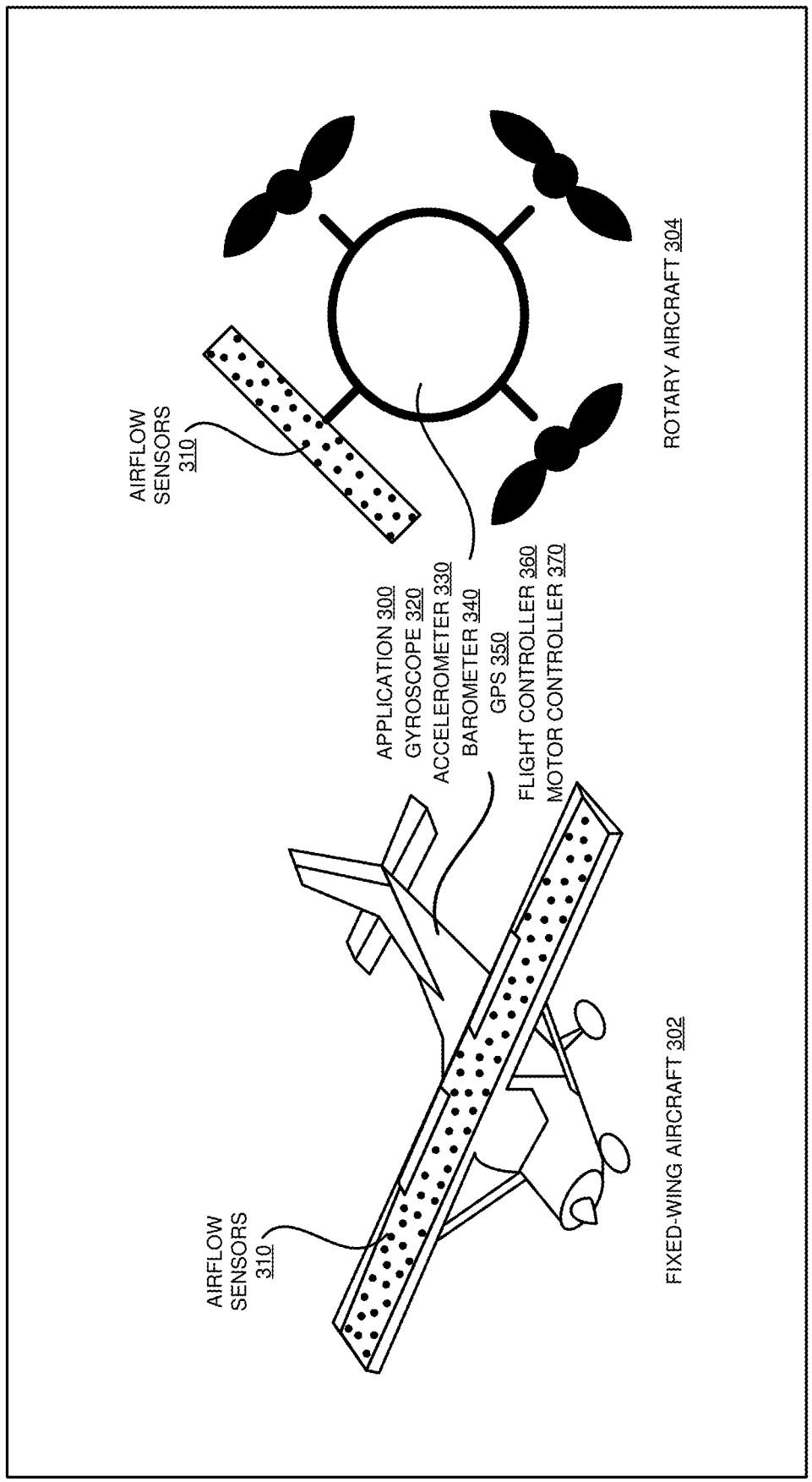
FIG. 3 depicts an example configuration for machine learning based airflow sensing for aircraft in accordance with an illustrative embodiment.

With reference to FIG. 3, this figure depicts an example configuration for machine learning based airflow sensing for aircraft in accordance with an illustrative embodiment. Fixed-wing aircraft 302 and rotary aircraft 304 are examples of device 132 in FIG. 1. Airflow sensors 310 are the same as airflow sensors 134 in FIG. 1. Application 300 is an example of application 105 in FIG. 1 and executes in fixed-wing aircraft 302 and rotary aircraft 304.

Fixed-wing aircraft 302 and rotary aircraft 304 have an array of airflow sensors 310 disposed on an airfoil. For example, fixed-wing aircraft 302 is depicted with array of airflow sensors 310 disposed along the upper surface of the main wing. Rotary aircraft 304 is depicted with array of airflow sensors 310 disposed along the upper surface of one of the rotor blades. Array of airflow sensors 310 can also be disposed along any other airfoil or suitable control surface of fixed-wing aircraft 302 and rotary aircraft 304.

Both fixed-wing aircraft 302 and rotary aircraft 304 include gyroscope 320, accelerometer 330, barometer 340, Global Positioning System (GPS) 350, flight controller 360, and motor controller 370. Gyroscope 320 measures orientation of aircraft 302 and 304. Accelerometer 330 measures acceleration of aircraft 302 and 304. Barometer 340 measures air pressure, and thus altitude, of aircraft 302 and 304. GPS 350 determines the location of aircraft 302 and 304. Flight controller 360 and motor controller 370 control, respectively, the flight control surfaces and one or more motors of aircraft 302 and 304, as directed by application 300.

Figure 4:
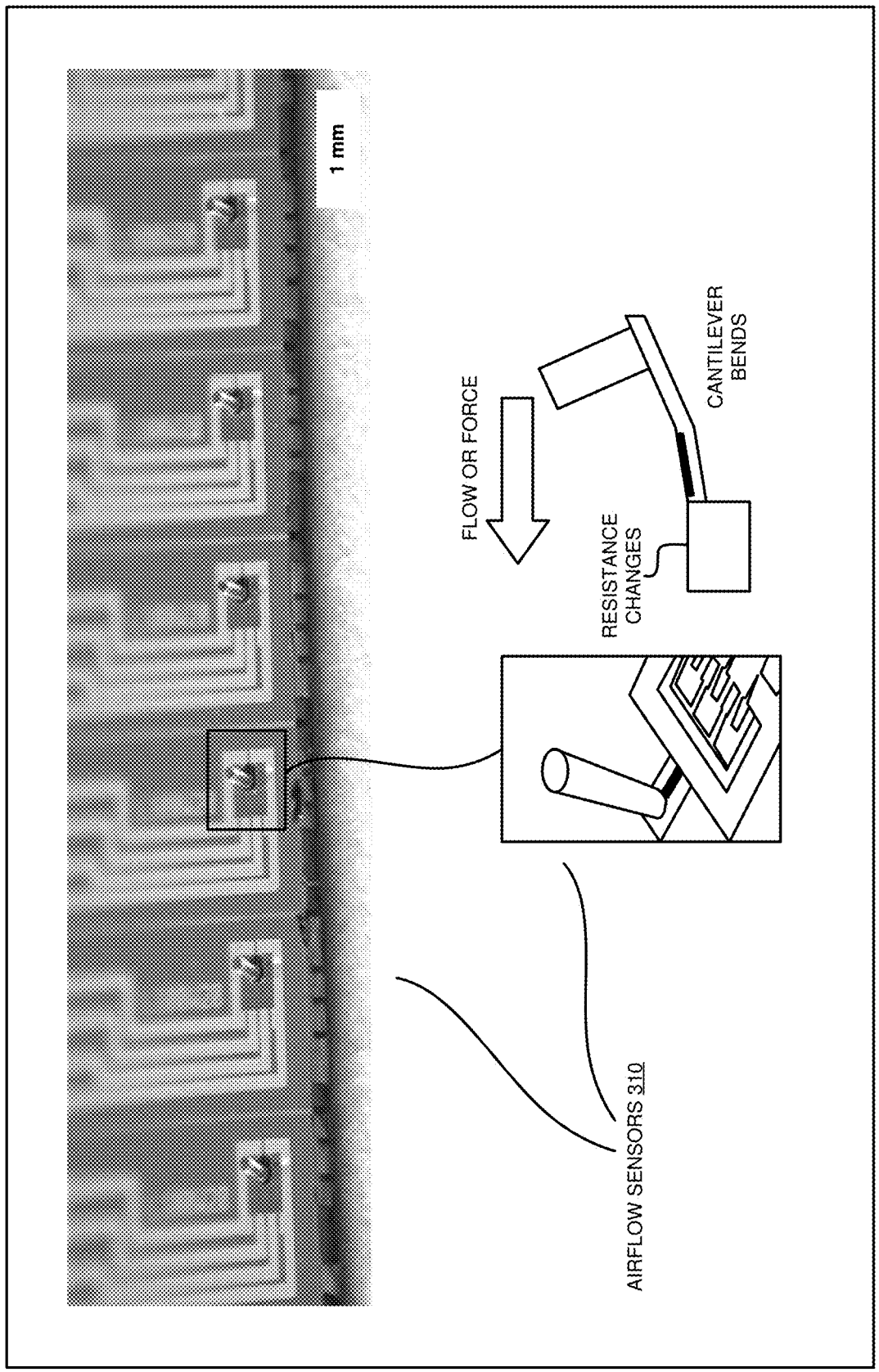
FIG. 4 depicts a more detail of an example configuration for machine learning based airflow sensing for aircraft in accordance with an illustrative embodiment.

With reference to FIG. 4, this figure depicts a more detail of an example configuration for machine learning based airflow sensing for aircraft in accordance with an illustrative embodiment. Airflow sensors 310 are the same as airflow sensors 310 in FIG. 3 and are mounted on any suitable airfoil, control surface, or the body of fixed-wing aircraft 302 and rotary aircraft 304 in FIG. 3.

FIG. 4 depicts a portion of an array of micro-machined airflow sensors 310, and more detail of one sensor 310. Each sensor includes an element that is displaced by airflow—here, a polymer post—along with another element—here, a doped silicon micro-cantilever—to detect the degree of displacement. Airflow exerts a force on the polymer post, deforming the attached micro-cantilever. The deformation creates a corresponding electrical resistance change. A Wheatstone bridge converts the resistance change to a corresponding voltage change, which is then amplified and detected.

Figure 5:
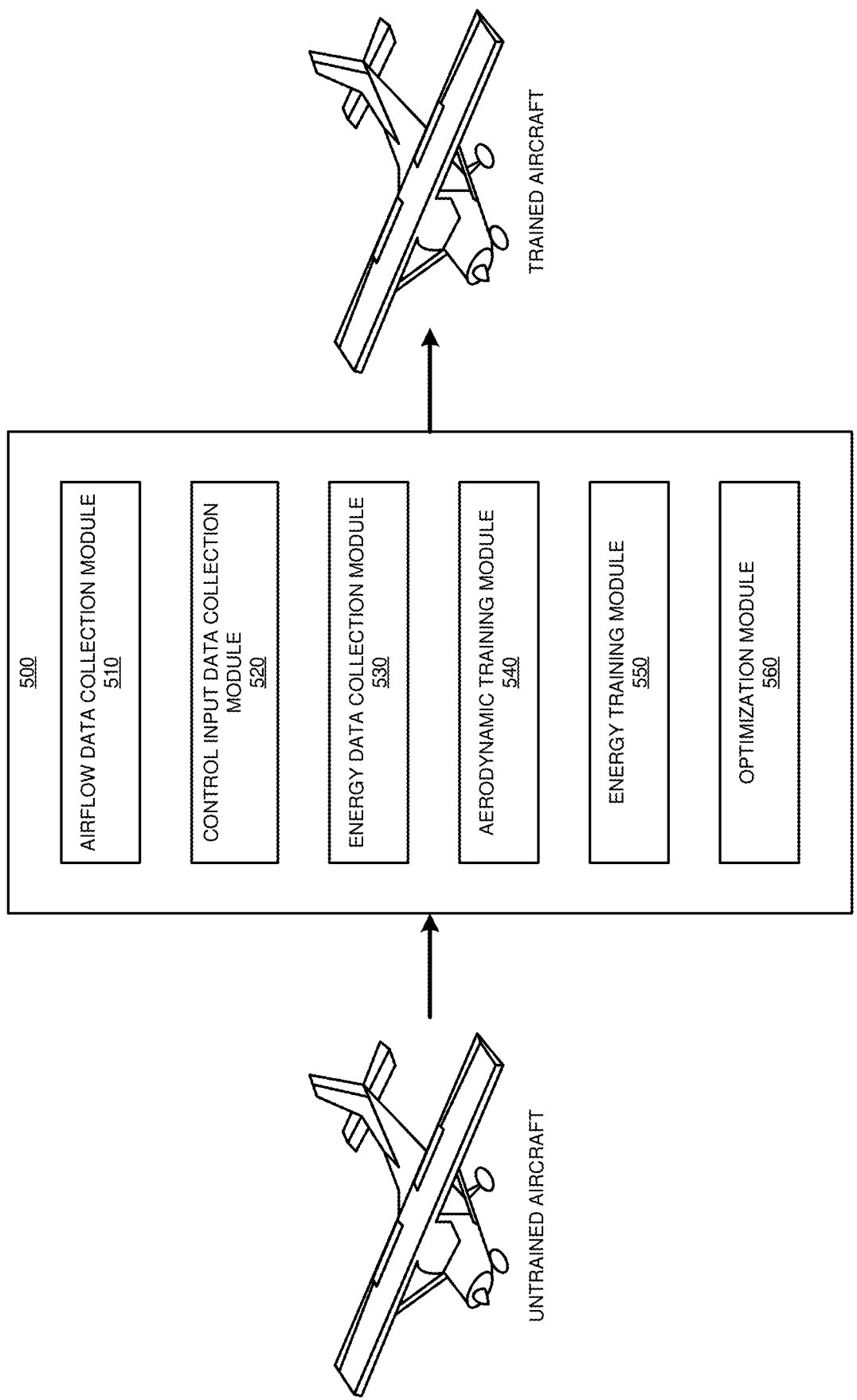
FIG. 5 depicts a block diagram of an example configuration for machine learning based airflow sensing for aircraft in accordance with an illustrative embodiment.

With reference to FIG. 5, this figure depicts a block diagram of an example configuration for machine learning based airflow sensing for aircraft in accordance with an illustrative embodiment. Application 500 is an example of application 105 in FIG. 1 and executes in fixed-wing aircraft 302 and rotary aircraft 304 in FIG. 3. Alternatively, application 500 is an example of a combination of training application 103 and application 105 in FIG. 1 and executes partially in fixed-wing aircraft 302 and rotary aircraft 304 in FIG. 3 and partially in any of servers 104 and 106 and clients 110, 112, and 114 in FIG. 1.

During flight, airflow data collection module 510 periodically collects a degree of deflection, converted to a voltage level, from each of airflow sensors 310 in FIG. 3 or FIG. 4, and saves each voltage level in a location in a two dimensional data array. To collect sufficient training data encompassing likely signs of an impending or actual aerodynamic state (such as VRS or blade stall in rotary aircraft, a wing stall in fixed-wing aircraft, or another aerodynamic state), humans fly aircraft 302 or 304 through a series of maneuvers, coming closer to the aerodynamic state, and eventually into the aerodynamic state, each time before recovering into normal flight. During each series of maneuvers, airflow data collection module 510 collects airflow data at periodic intervals.

Each data sample from each airflow sensor is labeled with a corresponding binary status. If the status is 0, airflow detected by a sensor is not in the target aerodynamic state, but is normal; if the status is 1, airflow is in the target aerodynamic state. As there are likely to be many more samples with a normal, or 0, status than there are samples with an abnormal status, application 500 compensates by using only a subset of the normal samples to ensure a sufficient number of abnormal samples.

Then, using the resulting collection of classified data arrays as training data, aerodynamic training module 540 trains a deep neural network of a suitable configuration to learn a correspondence between airflow data samples and corresponding status bits.

Application 500 also collects a time series of airflow sensor data snapshots collected by airflow data collection module 510, corresponding snapshots of data representing the states of relevant control inputs collected by control input data collection module 520, and energy consumption data over the same time series collected by energy data collection module 530. Energy training module 550 trains a recurrent neural network to find a correspondence between airflow sensor data and corresponding control settings and the resulting energy consumption. As well, optimization module 560 trains a model that determines settings for the aircraft controls and motor that are the most energy efficient.

Figure 6:
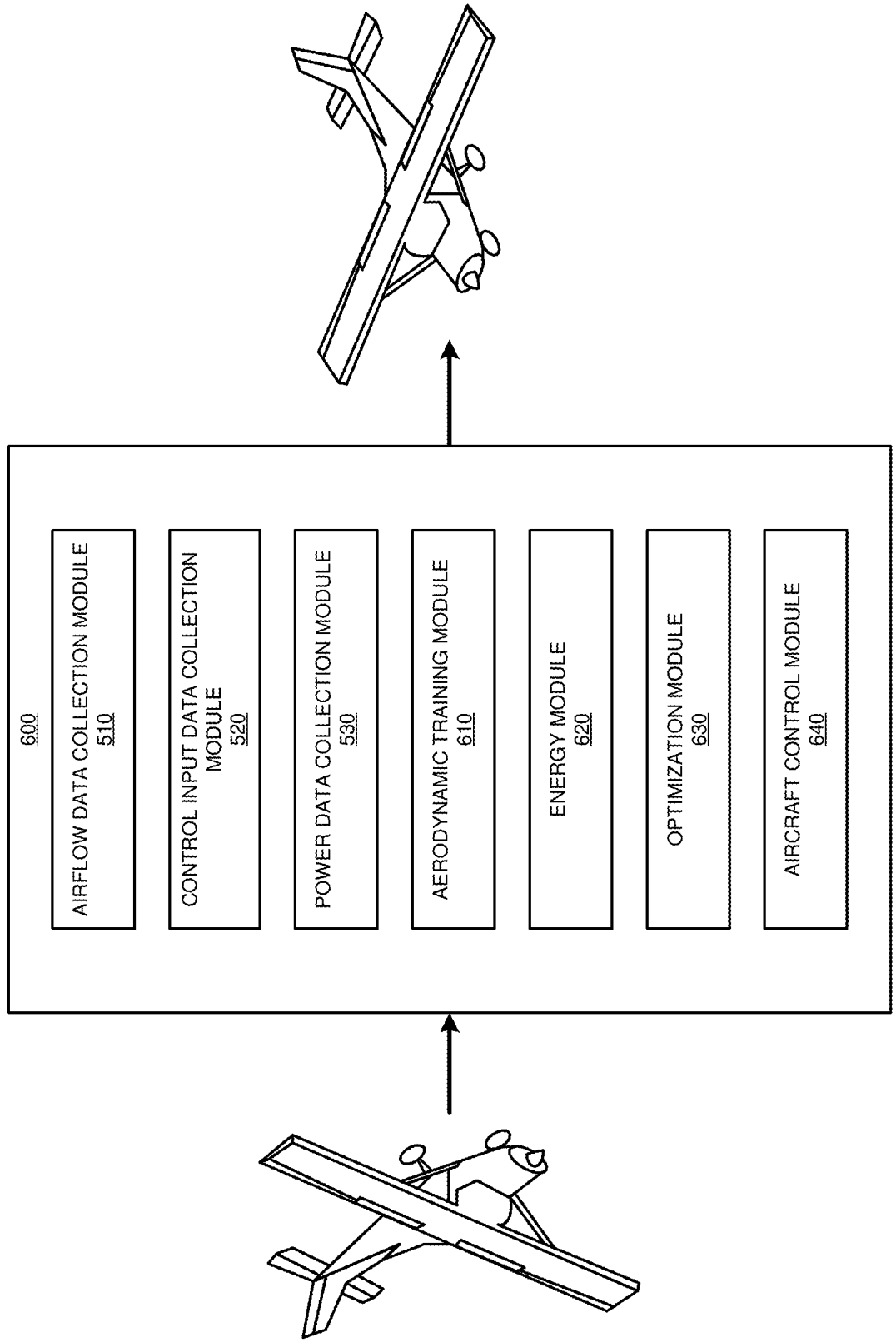
FIG. 6 depicts a block diagram of another example configuration for machine learning based airflow sensing for aircraft in accordance with an illustrative embodiment.

With reference to FIG. 6, this figure depicts a block diagram of another example configuration for machine learning based airflow sensing for aircraft in accordance with an illustrative embodiment. Application 600 is an example of application 105 in FIG. 1 and executes in fixed-wing aircraft 302 and rotary aircraft 304 in FIG. 3. Alternatively, application 600 is an example of a combination of training application 103 and application 105 in FIG. 1 and executes partially in fixed-wing aircraft 302 and rotary aircraft 304 in FIG. 3 and partially in any of servers 104 and 106 and clients 110, 112, and 114 in FIG. 1. Airflow data collection module 510, control input data collection module 520, and energy data collection module 530 are the same as airflow data collection module 510, control input data collection module 520, and energy data collection module 530 in FIG. 5.

In flight, airflow data collection module 510 collects data from airflow data sensors 310, control input data collection module 520 collects control input data, and energy data collection module 530 collects energy data. Aerodynamic model 610, now trained, analyzes the airflow data. If aerodynamic model 610 determines that the aircraft is approaching an undesired aerodynamic state, aircraft control module 640 adjusts control surfaces, one or more motors, and takes other appropriate action to return to normal flight. Energy model 620, now trained, analyzes the airflow data and corresponding control input data to predict energy consumption in real time. As well, given an aircraft pose, and airflow, control input, and energy consumption data, optimization model 630, now trained, uses aircraft control module 640 to adjust control surfaces, one or more motors, and take other appropriate action to set the aircraft controls and motor to the most energy-efficient settings.

Figure 7:
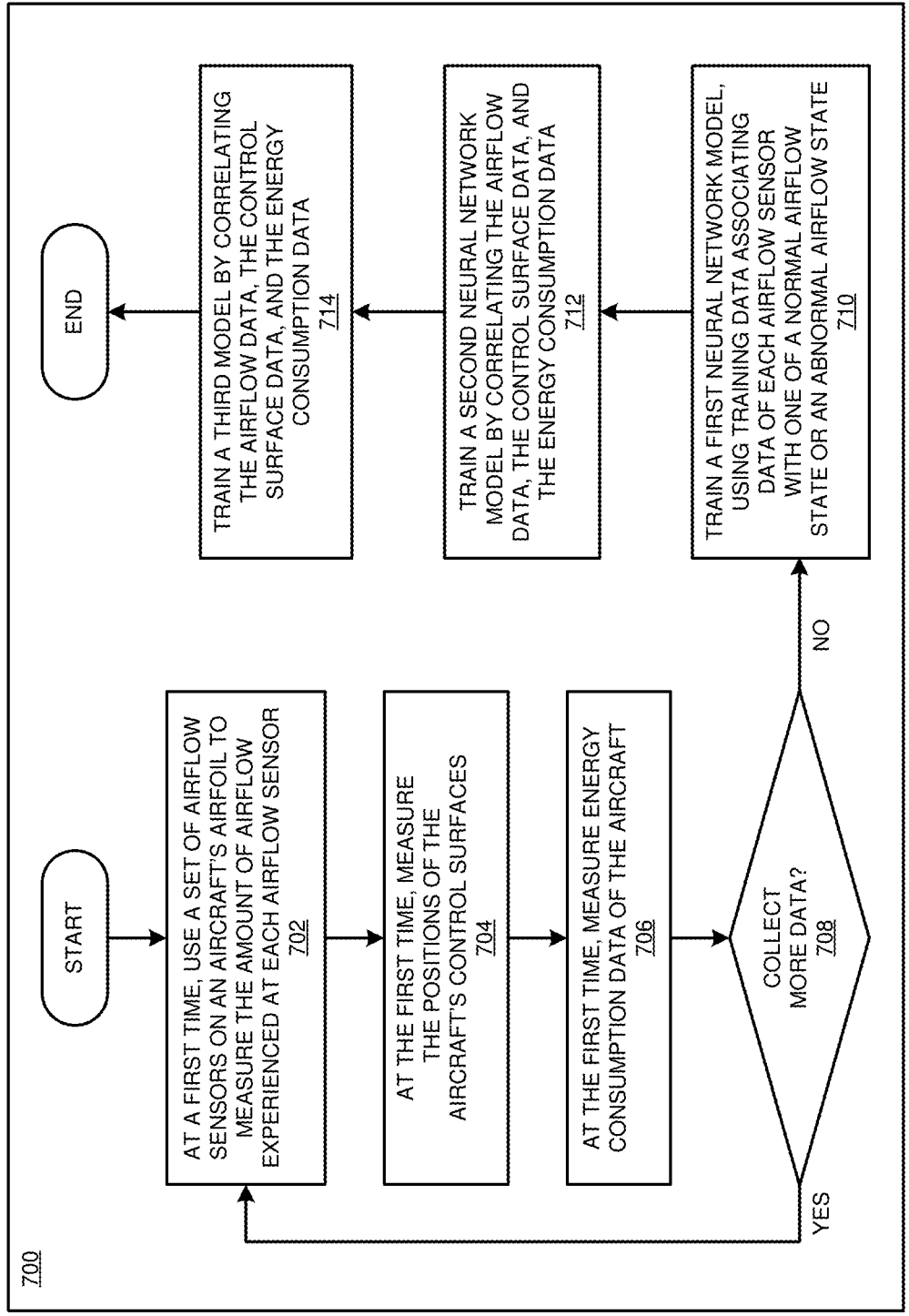
FIG. 7 depicts a flowchart of an example process for machine learning based airflow sensing for aircraft in accordance with an illustrative embodiment.

With reference to FIG. 7, this figure depicts a flowchart of an example process for machine learning based airflow sensing for aircraft in accordance with an illustrative embodiment. Process 700 can be implemented in application 500 in FIG. 5.

In block 702, the application, at a first time, uses a set of airflow sensors on an aircraft's airfoil to measure the amount of airflow experienced at each airflow sensor. In block 704, at the same first time, the application measures the positions of the aircraft's control surfaces. In block 706, at the same first time, the application measures energy consumption data of the aircraft. In block 708, the application determines whether more data is to be collected. If so ("YES" path of block 708), the application returns to block 702 to collect more data. Otherwise ("NO" path of block 708), in block 710 the application trains a first neural network model, using training data associating data of each airflow sensor with one of a normal or abnormal airflow state, at each data collection time. In block 712, the application trains a second neural network model by correlating the airflow data, the control surface data, and the energy consumption data. In block 714, the application trains a third model by correlating the airflow data, the control surface data, and the energy consumption data. Then the application ends.

Figure 8:
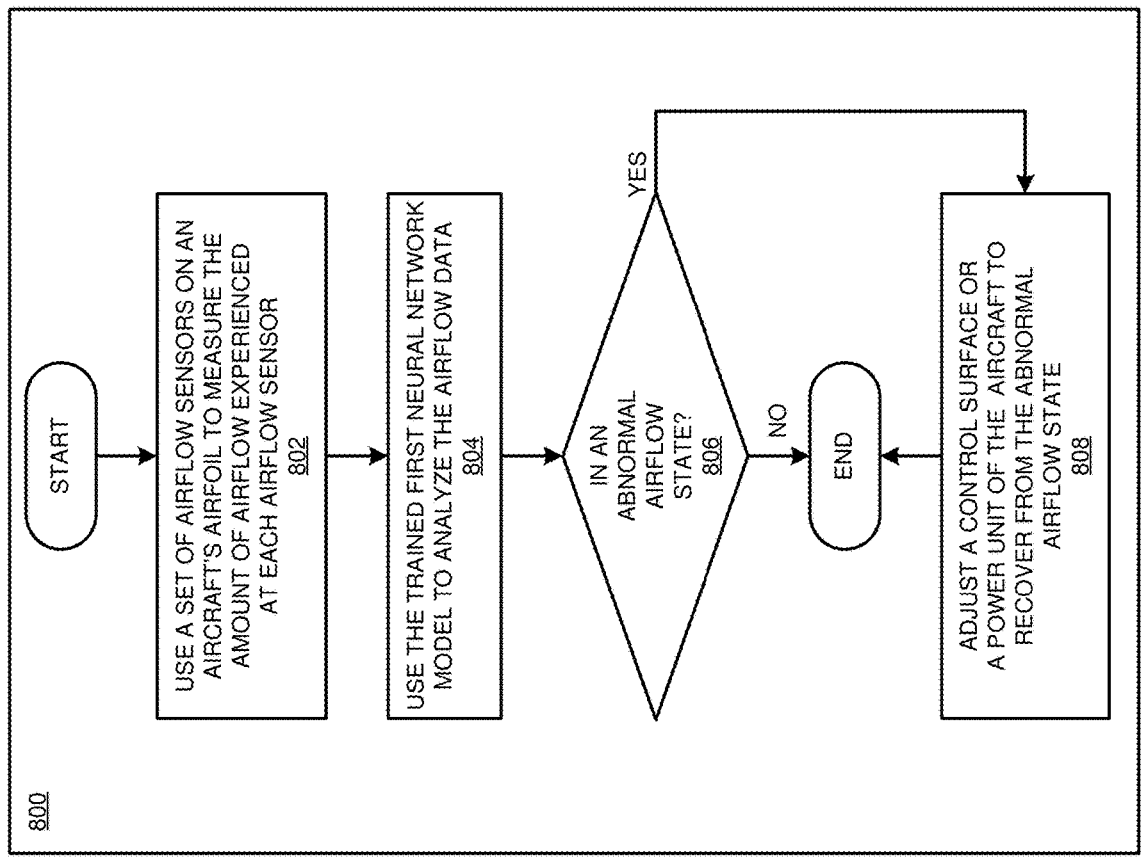
FIG. 8 depicts a flowchart of another example process for machine learning based airflow sensing for aircraft in accordance with an illustrative embodiment.

With reference to FIG. 8, this figure depicts a flowchart of another example process for machine learning based airflow sensing for aircraft in accordance with an illustrative embodiment. Process 800 can be implemented in application 600 in FIG. 6.

In block 802, the application uses a set of airflow sensors on an aircraft's airfoil to measure the amount of airflow experienced at each airflow sensor. In block 804, the application uses the trained first neural network model to analyze the airflow data. In block 806, the application determines whether the aircraft is in an abnormal airflow state. If so ("YES" path of block 806), in block 808 the application adjusts a control surface or a power unit of the aircraft to recover from the abnormal airflow state. Then the application ends.

Figure 9:
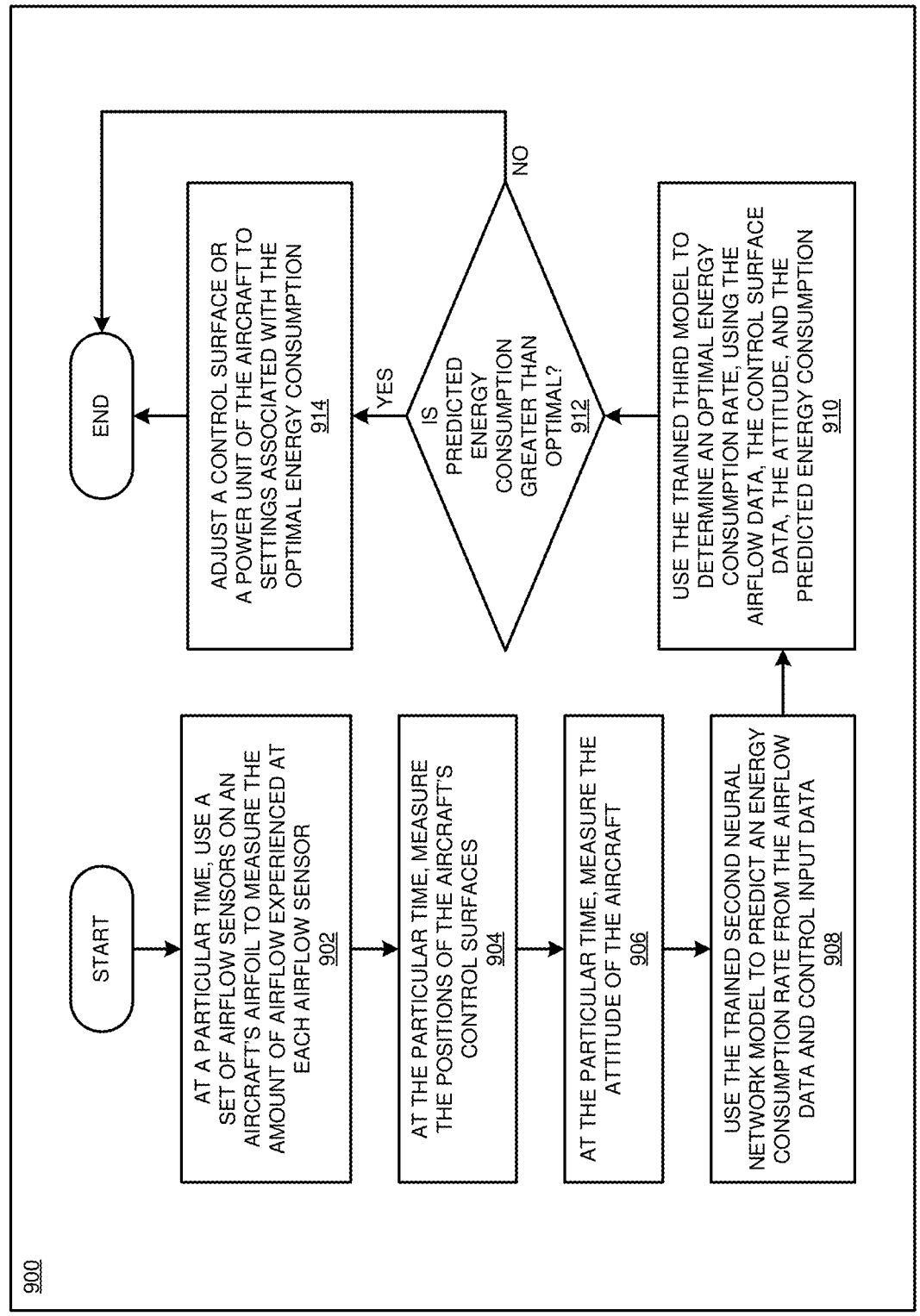
FIG. 9 depicts a flowchart of another example process for machine learning based airflow sensing for aircraft in accordance with an illustrative embodiment.

With reference to FIG. 9, this figure depicts a flowchart of another example process for machine learning based airflow sensing for aircraft in accordance with an illustrative embodiment. Process 900 can be implemented in application 600 in FIG. 6.

In block 902, the application uses a set of airflow sensors on an aircraft's airfoil to measure the amount of airflow experienced at each airflow sensor. In block 904, at the same time, the application measures the positions of the aircraft's control surfaces. In block 906, at the same time, the application measures the attitude of the aircraft. In block 908, the application uses the trained second neural network model to predict an energy consumption rate from the airflow data and control input data. In block 910, the application uses the trained third model to determine an optimal energy consumption rate, using the airflow data, control input data, and the attitude. In block 912, the application determines whether the predicted energy consumption is greater than optimal. If so ("YES" path of block 912), in block 914 the application adjusts a controls surface or a power unit of the aircraft to settings associated with the optimal energy consumption. Then the application ends.

Thus, a computer implemented method, system or apparatus, and computer program product are provided in the illustrative embodiments for machine learning based airflow sensing for aircraft and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    measuring, using a set of airflow sensors disposed on an airfoil of an aircraft, first airflow data comprising an amount of airflow experienced at each airflow sensor at a first time;
    analyzing, using a trained neural network model trained to classify airflow data from a first airflow sensor of the set of airflow sensors into either a first state or a second state, the first airflow data to determine an airflow state of the aircraft;
    adjusting, in response to determining that the aircraft is in an abnormal airflow state, at least one member from a set comprising (i) a control surface and (ii) a power unit of the aircraft; and
    returning, responsive to the adjusting, the aircraft to a normal airflow state.

2. The method of claim 1, wherein the abnormal airflow state comprises a stalled state.

3. The method of claim 1, wherein the aircraft comprises a rotary aircraft and the abnormal airflow state comprises a vortex ring state.

4. The method of claim 1, wherein the aircraft comprises a rotary aircraft and the abnormal airflow state comprises a blade stall state.

5. The method of claim 1, wherein the abnormal airflow state comprises a disrupted airflow state.

6. The method of claim 1, further comprising:
    measuring, using the set of airflow sensors, second airflow data comprising an amount of airflow experienced at each airflow sensor at a second time, the second time being earlier than the first time; and
    training, using training data associating the second airflow data of each airflow sensor with one of (i) the normal airflow state and (ii) the abnormal airflow state, a neural network model.

7. The method of claim 6, further comprising:
    measuring second control input data of the aircraft at the second time, the second control input data comprising a position of the control surface of the aircraft;
    measuring second energy consumption data of the aircraft at the second time;
    training, by correlating the second airflow data, the second control input data, and the second energy consumption data, a second neural network model;
    measuring first control input data of the aircraft at the first time; and predicting, using the trained second neural network model, the first airflow data and the first control input data, an energy consumption rate of the aircraft.

8. The method of claim 7, further comprising:
training, by correlating the second airflow data, the second control input data, and the second energy consumption data, a third model;
measuring, at the first time, an attitude of the aircraft;
analyzing, using the trained third model, the first airflow data, the first control input data, the predicted energy consumption rate, and the attitude to determine an optimal energy consumption rate;
adjusting, in response to determining that the predicted energy consumption rate is greater than the optimal energy consumption rate, the control surface of the aircraft, the adjusting causing a control surface setting matching a control surface setting associated with the optimal energy consumption rate;
adjusting, in response to determining that the predicted energy consumption rate is greater than the optimal energy consumption rate, the power unit of the aircraft, the adjusting causing a power unit setting matching a power unit setting associated with the optimal energy consumption rate.

9. A computer usable program product comprising one or more computer-readable storage media, and program instructions stored on at least one of the one or more storage media, the stored program instructions when executed by a processor causing operations comprising:
measuring, using a set of airflow sensors disposed on an airfoil of an aircraft, first airflow data comprising an amount of airflow experienced at each airflow sensor at a first time;
analyzing, using a trained neural network model trained to classify airflow data from a first airflow sensor of the set of airflow sensors into either a first state or a second state, the first airflow data to determine an airflow state of the aircraft;
adjusting, in response to determining that the aircraft is in an abnormal airflow state, at least one member from a set comprising (i) a control surface and (ii) a power unit of the aircraft; and
returning, responsive to the adjusting, the aircraft to a normal airflow state.

10. The computer usable program product of claim 9, wherein the abnormal airflow state comprises a stalled state.

11. The computer usable program product of claim 9, wherein the aircraft comprises a rotary aircraft and the abnormal airflow state comprises a vortex ring state.

12. The computer usable program product of claim 9, wherein the aircraft comprises a rotary aircraft and the abnormal airflow state comprises a blade stall state.

13. The computer usable program product of claim 9, wherein the abnormal airflow state comprises a disrupted airflow state.

14. The computer usable program product of claim 9, further comprising:
measuring, using the set of airflow sensors, second airflow data comprising an amount of airflow experienced at each airflow sensor at a second time, the second time being earlier than the first time; and
training, using training data associating the second airflow data of each airflow sensor with one of (i) the normal airflow state and (ii) the abnormal airflow state, a neural network model.

15. The computer usable program product of claim 14, further comprising:

measuring second control input data of the aircraft at the second time, the second control input data comprising a position of the control surface of the aircraft;
measuring second energy consumption data of the aircraft at the second time;
training, by correlating the second airflow data, the second control input data, and the second energy consumption data, a second neural network model;
measuring first control input data of the aircraft at the first time; and
predicting, using the trained second neural network model, using the trained second neural network model, the first airflow data and the first control input data, an energy consumption rate of the aircraft.

16. The computer usable program product of claim 15, further comprising:
training, by correlating the second airflow data, the second control input data, and the second energy consumption data, a third model;
measuring, at the first time, an attitude of the aircraft;
analyzing, using the trained third model, the first airflow data, the first control input data, the predicted energy consumption rate, and the attitude to determine an optimal energy consumption rate;
adjusting, in response to determining that the predicted energy consumption rate is greater than the optimal energy consumption rate, the control surface of the aircraft, the adjusting causing a control surface setting matching a control surface setting associated with the optimal energy consumption rate; and
adjusting, in response to determining that the predicted energy consumption rate is greater than the optimal energy consumption rate, the power unit of the aircraft, the adjusting causing a power unit setting matching a power unit setting associated with the optimal energy consumption rate.

17. The computer usable program product of claim 9, wherein the stored program instructions are stored in the one or more computer-readable storage media in a data processing system, and wherein the stored program instructions are transferred over a network from a remote data processing system.

18. The computer usable program product of claim 9, wherein the stored program instructions are stored in the one or more computer-readable storage media in a server data processing system, and wherein the stored program instructions are downloaded over a network to a remote data processing system for use in the one or more computer-readable storage media associated with the remote data processing system.

19. An apparatus comprising:
an airflow sensor disposed on an airfoil of an aircraft, the airflow sensor configured to measure airflow data comprising an amount of airflow experienced at the airflow sensor at a first time;
a hardware computing element in the aircraft, the hardware computing element comprising a processor, a computer-readable memory, and a computer-readable storage device configured to execute a trained neural network model in the aircraft, wherein the trained neural network model is trained to determine, by classifying the airflow data into either a first state or a second state, an airflow state of the aircraft from the airflow data; and
at least one member from a set comprising (i) an adjustable control surface of the aircraft coupled with the hardware computing element, and (ii) an adjustable power unit of the aircraft coupled with the hardware computing element.

20. The apparatus of claim 19, further comprising:

an actuator, the actuator adjusting the at least one member from the set comprising the adjustable control surface and the adjustable power unit of the aircraft, the actuator causing the aircraft to return to a normal airflow state responsive to the adjusting.

* * * * *